(12) United States Patent
Van Den Berg et al.

(10) Patent No.: US 10,400,920 B2
(45) Date of Patent: Sep. 3, 2019

(54) DOUBLE SKINNED PIPE ASSEMBLY

(71) Applicant: ROLLS-ROYCE plc, London (GB)

(72) Inventors: Merijn Van Den Berg, Derby (GB); Ian D. Robertson, Derby (GB)

(73) Assignee: ROLLS-ROYCE plc, London (GB)

( * ) Notice: Subject to any disclaimer, the term of this patent is extended or adjusted under 35 U.S.C. 154(b) by 196 days.

(21) Appl. No.: 15/430,763

(22) Filed: Feb. 13, 2017

(65) Prior Publication Data

US 2017/0254445 A1 Sep. 7, 2017
US 2019/0242500 A9 Aug. 8, 2019

(30) Foreign Application Priority Data

Mar. 7, 2016 (GB) .................................. 1603870.5

(51) Int. Cl.
| F16L 9/19 | (2006.01) |
| F02C 7/06 | (2006.01) |
| F16L 13/02 | (2006.01) |
| F16L 39/00 | (2006.01) |
| F16L 41/08 | (2006.01) |
| F01D 25/18 | (2006.01) |

(52) U.S. Cl.
CPC .............. *F16L 9/19* (2013.01); *F02C 7/06* (2013.01); *F16L 13/02* (2013.01); *F16L 39/005* (2013.01); *F16L 41/084* (2013.01); *F01D 25/18* (2013.01); *F05D 2220/32* (2013.01); *F05D 2260/98* (2013.01); *F16L 2201/30* (2013.01)

(58) Field of Classification Search
CPC .......................... F16L 9/19; F16L 39/00–39/06
USPC ....................... 285/32, 89, 92, 123.1, 123.15
See application file for complete search history.

(56) References Cited

U.S. PATENT DOCUMENTS

| 4,732,414 A | * | 3/1988 | Inaba | F16L 39/005 285/123.15 |
| 5,458,375 A | * | 10/1995 | Anspach, Jr. | F16L 39/04 285/121.2 |
| 5,498,036 A | * | 3/1996 | Kingsford | F16L 19/0283 285/123.1 |
| 7,427,084 B1 | | 9/2008 | Betz | |
| 2009/0284004 A1 | * | 11/2009 | Simmons | F16L 19/028 285/123.15 |
| 2010/0186845 A1 | | 7/2010 | Knotten | |

OTHER PUBLICATIONS

Jul. 11, 2016 Search Report issued in Great Britain Patent Application No. 1603870.5.

* cited by examiner

*Primary Examiner* — James M Hewitt, II
(74) *Attorney, Agent, or Firm* — Oliff PLC

(57) ABSTRACT

A double skinned feed or scavenge pipe assembly comprises; an inner pipe (22) and an outer pipe (23) enclosing the inner pipe and defining an annular space (24) between the inner pipe and the outer pipe and a sleeve (28) configured to slip over the outer pipe (23). Complementary threads (29) are provided on an outer wall of the outer pipe (23) and an inner wall of the sleeve (28). A lock, for example in the form of a locking nut (31) is positioned over the outer pipe (23) when the complementary threads (29) of the outer pipe and sleeve are engaged. The configuration of the assembly is such that, in use, the sleeve (28) is slidable between a first position where the inner pipe (22) is accessible and a second position wherein the inner pipe (22) is completely enclosed.

12 Claims, 3 Drawing Sheets

DOUBLE SKINNED PIPE ASSEMBLY

TECHNICAL FIELD OF INVENTION

The invention relates to a double skinned pipe assembly and more particularly to accessibility to joins between an end of such an assembly and a surface of a body fed or scavenged by the pipe.

BACKGROUND TO THE INVENTION

Double skinned pipe assemblies are known. Commonly, they comprise of an inner pipe containing a first fluid and an outer pipe containing a second fluid in an annular space encircling the inner pipe. The second fluid is typically air and the annular space serves to contain any fluid leaking from a crack in a wall of the inner pipe. Such pipes typically form part of a long supply line. They are often segmented and connected by suitably designed couplings and can thus be disassembled and reassembled without issue.

In gas turbine engines, there is a need to feed fluids such as oil to various moving components within the engine. This presents a need for feed pipes from the fluid source across the engine. Such pipes will typically be joined to a surface of the body to be fed or scavenged in a manner which prevents leakage of oil outside of the body. For example, such pipes may be welded to the body. Conventionally, these feed pipes have been composed of a single walled pipe. With the advancement of engine technology, the temperature of air passing through the engine is ever increasing. In the event of a leakage of the pipe, there is increased risk of ignition of flammable fluids which has the potential to result in an engine fire. Consequently, great care must be taken in the selection, manufacture and installation of the material of a single walled pipe to minimise the risk of engine fire.

Whilst the use of a second skin is known to contain leaks, this presents difficulties in installation inside an engine. The use of segmented pipes and multiple couplings as is known for current double skinned pipe applications is undesirable. A challenge arises in installing a double skinned feed pipe in such an application.

STATEMENT OF THE INVENTION

In accordance with the present invention there is provided a double skinned pipe assembly comprising;
an inner pipe and an outer pipe enclosing the inner pipe and defining an annular space between the inner pipe and the outer pipe;
a sleeve configured to slip over the outer pipe;
complementary threads on an outer wall of the outer pipe and an inner wall of the sleeve; and
a lock for locking the sleeve in position over the outer pipe when the complementary threads of the outer pipe and sleeve are engaged, wherein the configuration of the assembly is such that, in use, the sleeve is slidable between a first position where the inner pipe may be accessed and a second position wherein the inner pipe is completely enclosed.

For example, the pipe may be an oil feed pipe or an oil scavenge pipe.

The lock may comprise a locking nut which includes a thread which is complementary to the thread on the outer pipe and is arranged to be threaded onto the outer pipe after the sleeve has been threaded onto the outer pipe. The lock may further include a tab washer arranged between a locking nut and the sleeve and receivable in a tab washer groove provided in a mid-portion of the thread, wherein once the sleeve and locking nut are arranged for locking, the tabs of the washer can be bent and engage with the nut and or sleeve to restrict axial and/or rotational movement thereof. In these embodiments, the sleeve locks up against the lock nut, such that the pipe itself is not torque loaded.

In an alternative, the lock may comprise a clamp engageable around the outer pipe and optionally also the sleeve.

The lock may be incorporated into the sleeve and/or the outer pipe. For example, the sleeve might incorporate a ratchet. In another example, the outer pipe may include an anti-rotation feature engaged by the sleeve when fully engaged to close the access space.

The outer pipe may include a flange against which the sleeve may abut when the sleeve is in the second position. As an alternative to a flange, the outer pipe may comprise a plurality of substantially equally spaced radially outward protrusions against which the sleeve may abut when the sleeve is in the second position. Other stop devices will no doubt occur to the skilled addressee without departing from the scope of the invention as claimed.

The inner pipe may be welded at a junction with a body into which the inner pipe feeds. Depending on the application of and environment in which the pipe assembly is to be used, alternative joining methods may be used. For example, the body may be the hub of a bearing structure in a gas turbine engine. The sleeve may pass through an orifice in a structure and a seal ring may be provided around the outer pipe.

As will be appreciated, when the assembly is installed to feed into a body, the sleeve can be slid up and down to allow access to the joint between the inner pipe and the body. Because it is adjustable it can also easily take tolerances into account and hence provides protection of the maximum extent possible.

Embodiments of the invention provide protection over the maximum length of the inner pipe without over constraining the assembly. The inner pipe can be joined to the body using conventional joining processes.

Where the inner pipe is joined to a body using a fusion process (for example welding or brazing), the adjustable sleeve allows access to inspect the join and to check for leakage from the join or inner pipe. Because the sleeve is adjustable, manufacturing tolerances can be corrected ensuring that the inner pipe can be enclosed over its entire length.

BRIEF DESCRIPTION OF THE FIGURES

An embodiment of the invention may be further described with reference to the accompanying Figures in which.

DETAILED DESCRIPTION OF FIGURES AND EMBODIMENTS

Figure 1:
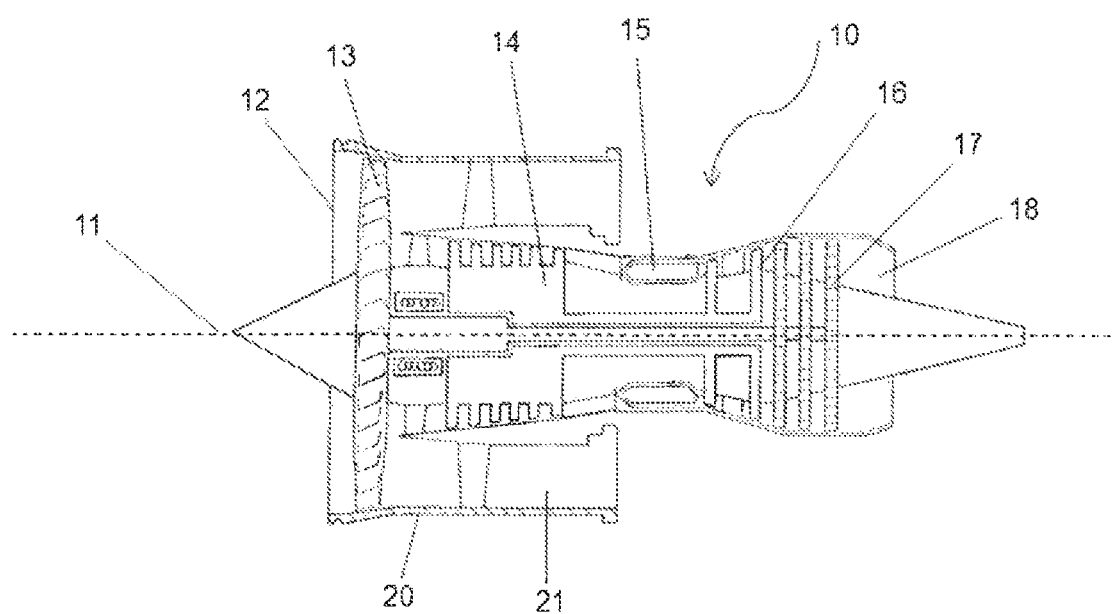
FIG. 1 shows a section through a gas turbine engine as is known from the prior art and into which a double skinned pipe assembly of the invention might be incorporated.

With reference to FIG. 1, a gas turbine engine is generally indicated at 10, having a principal and rotational axis 11. The engine 10 comprises, in axial flow series, an air intake 12, a propulsive fan 13, a high-pressure compressor 14, combustion equipment 15, a high-pressure turbine 16, a low-pressure turbine 17 and an exhaust nozzle 18. A nacelle 20 generally surrounds the engine 10 and defines the intake 12.

The gas turbine engine 10 works in the conventional manner so that air entering the intake 12 is accelerated by the fan 13 to produce two air flows: a first air flow into the high-pressure compressor 14 and a second air flow which passes through a bypass duct 21 to provide propulsive thrust. The high-pressure compressor 14 compresses the air flow directed into it before delivering that air to the combustion equipment 15.

In the combustion equipment 15 the air flow is mixed with fuel and the mixture combusted. The resultant hot combustion products then expand through, and thereby drive the high and low-pressure turbines 16, 17 before being exhausted through the nozzle 18 to provide additional propulsive thrust. The high 16 and low 17 pressure turbines drive respectively the high pressure compressor 14 and the fan 13, each by suitable interconnecting shaft.

Other gas turbine engines to which the present disclosure may be applied may have alternative configurations. By way of example such engines may have an alternative number of interconnecting shafts (e.g. three) and/or an alternative number of compressors and/or turbines. Further the engine may comprise a gearbox provided in the drive train from a turbine to a compressor and/or fan.

It will be understood that with many moving parts within the engine, it is necessary to maintain a reservoir of oil and provide a network of supply pipes to components in need of lubrication. For example, these pipes may extend radially across the engine between rotating parts to feed bearings in the engine core about which the rotating parts are mounted. For example, the pipe may pass between stages 16, 17 of the turbine 10 and into a bearing structure within which the shaft which drives the turbines is mounted.

Figure 2:
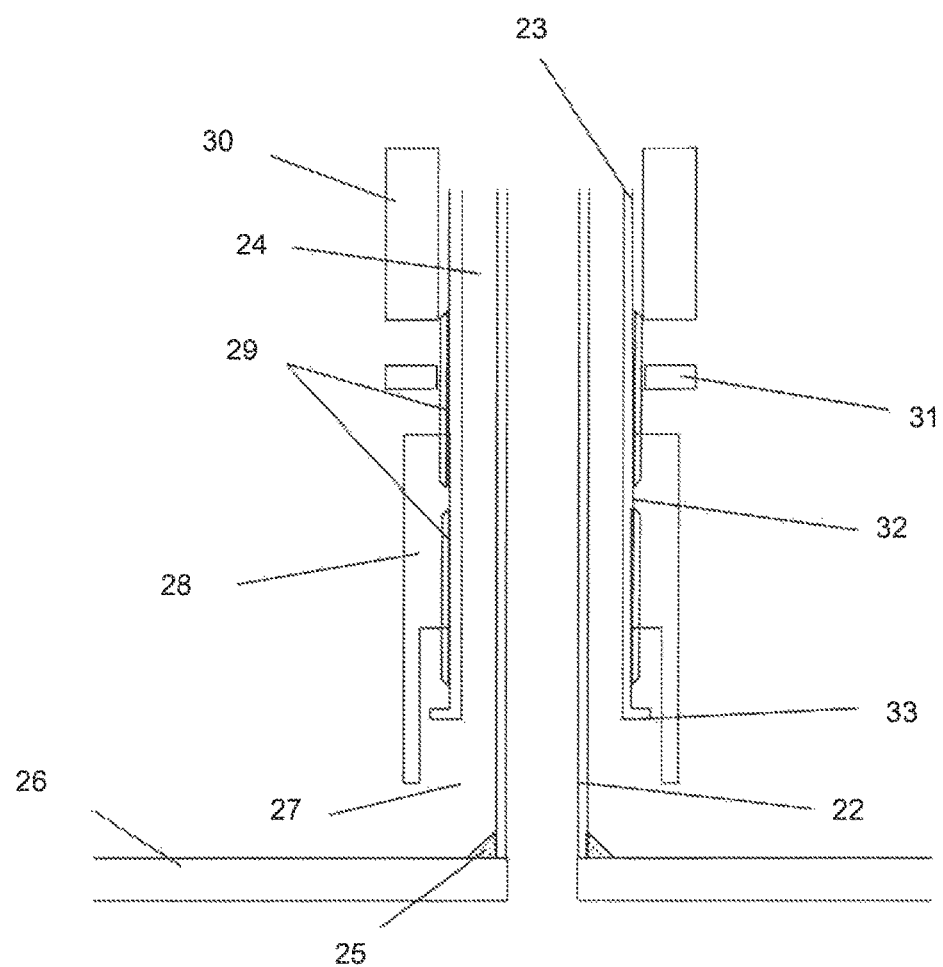
FIG. 2 shows an embodiment of a double skinned pipe assembly in accordance with the invention where the inner pipe is accessible.
Figure 3:
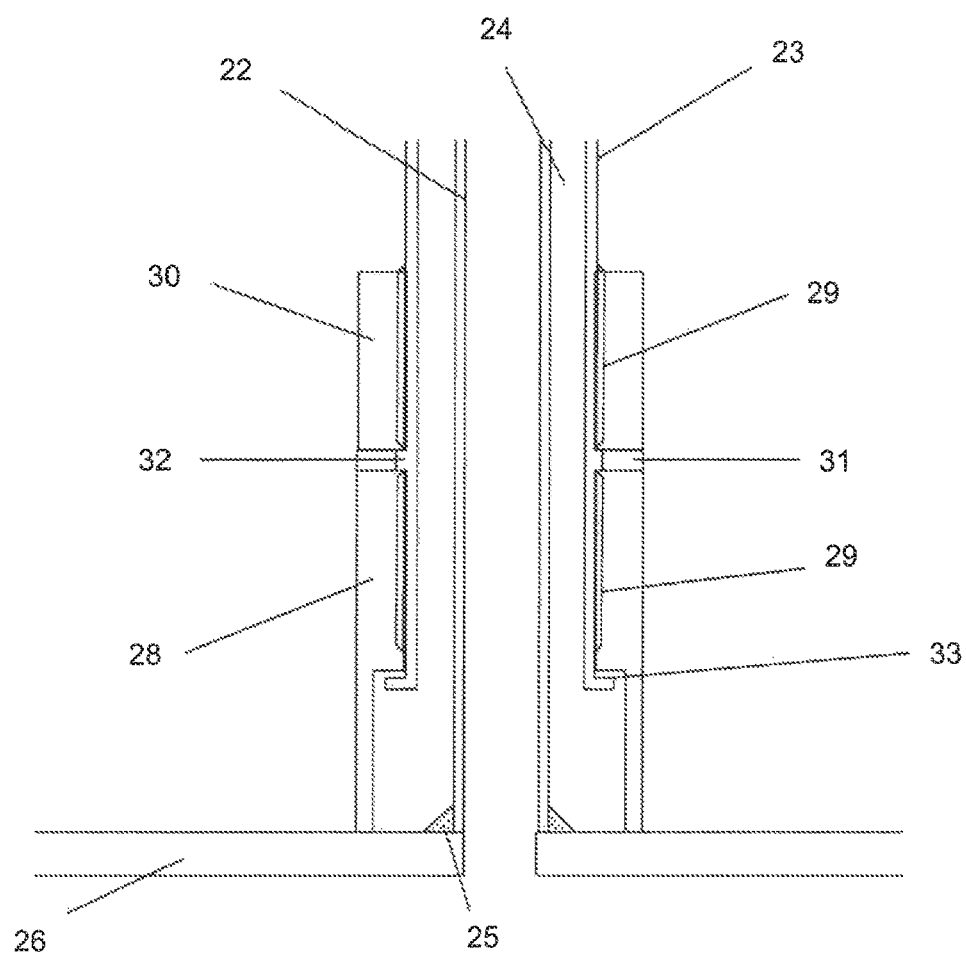
FIG. 3 shows the embodiment of FIG. 2 where the inner pipe is fully enclosed.

FIGS. 2 and 3 show an assembly in accordance with the invention. In FIG. 2, the assembly is configured to allow access to the inner pipe 22 of the double walled pipe, in FIG. 3 the assembly is configured completely to enclose the inner pipe 22. As can be seen, the double walled pipe comprises an inner pipe 22 and an outer pipe 23 defining an annular space 24 therebetween. The inner wall 22 is joined to a body 26 by a weld 25 and is arranged to deliver a first fluid into the body 26. For example, the body might be a bearing a hub of a bearing structure and the first fluid may be a lubricant for the bearing components.

The outer pipe 23 terminates short of the welded joint 25 leaving a space 27 sufficient to allow access to the welded joint 25 and the annular space 24.

A sleeve 28 sits around the outer pipe 23 and has an inner thread which engages with a complementary thread 29 arranged on an outer circumferential surface of the outer pipe 23. It will appreciated that the sleeve 28 can be moved axial with respect to a common central axis of the inner pipe 22 and outer pipe 23 by turning the sleeve 28 about this axis with the complementary threads engaged. As can be seen from FIG. 3, the complementary threads are arranged such that, when fully threaded, the sleeve closes the access space 27, meets the body 28 and encloses the welded joint 25.

A locking nut 30 also sits around the outer pipe 23 and also has an inner thread which engages with a complementary thread 29 arranged on an outer circumferential surface of the outer pipe 23. Finally a tab washer 31 sits around the outer pipe 23 between the sleeve 28 and locking nut 30. As can be seen in FIG. 3, the tab washer 31 can engage in a circumferential groove 32 which sits in a mid-portion of the thread 29. The outer pipe 23 is provided with a flange 33 against which the sleeve 28 can abut.

One or both of the threaded adjustable sleeve 28 and threaded locking nut 30 may be provided with flats for a spanner on their outside. After the inner pipe 22 is fixed to the body 26 the adjustable sleeve 28 may be wound along the thread 29 until a desired gap 27 is achieved between the sleeve 28 and the body 26. This gap 27 may be controlled by a slip gauge for example. By reversing the direction of winding along the threads 29, the gap 27 can be closed (see FIG. 3). To lock the sleeve 28 in this position the locking nut 30 is wound tight to the sleeve, restricting its ability to reverse wind. The sleeve 28 and lock nut 30 may be torqued up against each other, for example by using a spanner and the flats. The tab washer 31 can be used to lock the positions of the sleeve 28 and nut 30. After torqueing the sleeve 28 and locking nut 30, tabs of the tab washer 31 may be bent up and down to restrict axial and/or rotational movement of the sleeve 28 and nut 30.

Alternative locking arrangements for locking the sleeve 28 in the "gap-closed" position will no doubt occur to the skilled addressee, the described locking arrangement configuration is not considered essential to the invention.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

As an alternative to using the locking nut 30, the lock may comprise a clamp engageable around the outer pipe and optionally also the sleeve. The lock may be incorporated into the sleeve and/or the outer pipe. For example, the sleeve might incorporate a ratchet. In another example, the outer pipe may include an anti-rotation feature engaged by the sleeve when fully engaged to close the access space. As an alternative to flange 33, the outer pipe may comprise a plurality of substantially equally spaced radially outward protrusions against which the sleeve may abut when the sleeve is in the second position.

The invention claimed is:

1. A double skinned pipe assembly comprising:
   an inner pipe and an outer pipe enclosing the inner pipe and defining an annular space between the inner pipe and the outer pipe;
   a sleeve configured to slip over the outer pipe;
   complementary threads on an outer wall of the outer pipe and an inner wall of the sleeve; and
   a lock for locking the sleeve in position over the outer pipe when the complementary threads of the outer pipe and sleeve are engaged, wherein the configuration of the assembly is such that, in use, the sleeve is movable between a first position where the inner pipe may be accessed and a second position wherein the inner pipe is completely enclosed.

2. A double skinned pipe assembly as claimed in claim 1 wherein the lock comprises a locking nut which includes a thread which is complementary to the thread on the outer pipe and is arranged to be threaded onto the outer pipe after the sleeve has been threaded onto the outer pipe.

3. A double skinned pipe assembly as claimed in claim 2 wherein the lock further includes a tab washer arranged between the locking nut and the sleeve and receivable in a tab washer groove provided in a mid-portion of the thread, wherein once the sleeve and locking nut are arranged for locking, the tabs of the washer can be bent and engage with the nut and/or sleeve to restrict axial and/or rotational movement thereof.

4. A double skinned pipe assembly as claimed in claim 1 wherein the lock is incorporated into the sleeve and/or the outer pipe.

5. A double skinned pipe assembly as claimed in claim 4 wherein the lock comprises an anti-rotation feature on the outer pipe configured to engage with the sleeve when the sleeve is in the second position.

6. A double skinned pipe assembly as claimed in claim 1 wherein the outer pipe includes a stop against which the sleeve abuts when the sleeve is in the second position.

7. A double skinned pipe assembly as claimed in claim 6 wherein the stop comprises a flange.

8. A double skinned pipe assembly as claimed in claim 1 wherein the inner pipe is joined to a body into/out of which the inner pipe feeds or scavenges.

9. A double skinned pipe assembly as claimed in claim 8 wherein the inner pipe is welded to the body.

10. A double skinned pipe assembly as claimed in claim 8 wherein the body comprises a hub of a bearing chamber in a gas turbine engine.

11. A gas turbine engine incorporating a double skinned pipe assembly as claimed in claim 1 wherein the inner pipe is joined to and arranged to feed into or scavenge out of a hub of a bearing chamber.

12. A gas turbine engine incorporating a double skinned pipe assembly as claimed in claim 4 wherein the inner pipe is joined to and arranged to feed into or scavenge out of a hub of a bearing chamber.

* * * * *